May 30, 1939.  A. L. WALLACE ET AL  2,160,240
HOSE GUARD
Filed Feb. 17, 1936
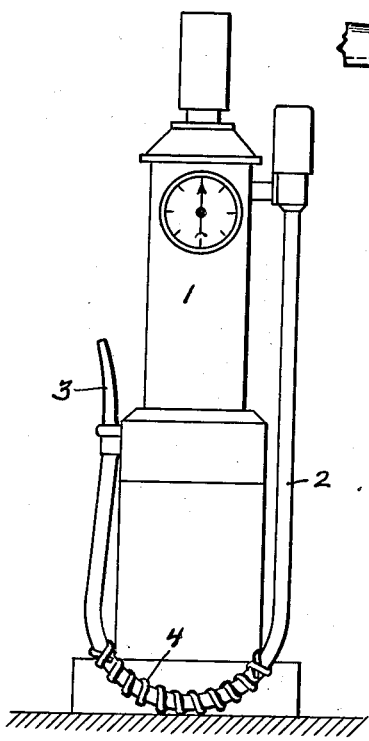
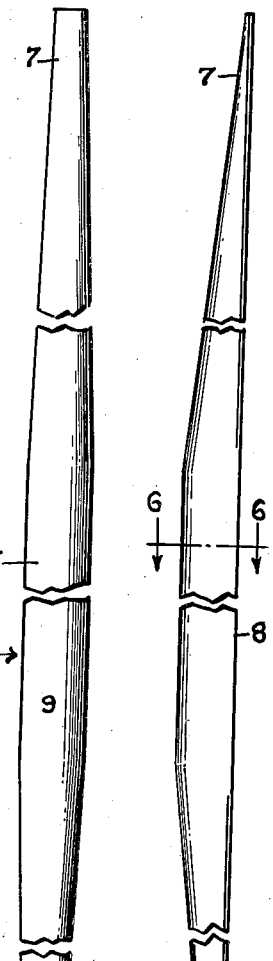
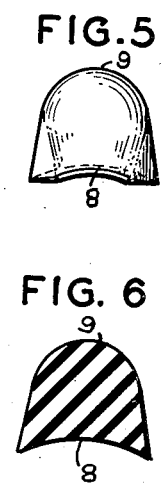
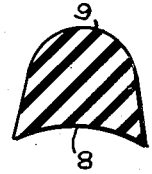
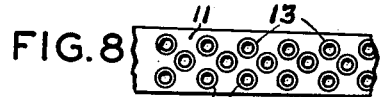
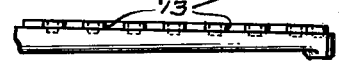
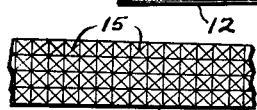
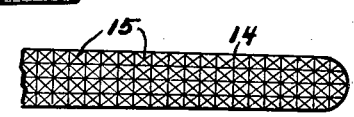
A. L. Wallace and R. Berkowitz INVENTORS.
BY Thomas Howe ATTORNEY.

Patented May 30, 1939

2,160,240

UNITED STATES PATENT OFFICE 2,160,240

HOSE GUARD

Archibald L. Wallace, Northport, and Robert Berkowitz, Woodmere, N. Y., assignors to Metal Hose & Tubing Co., Inc., a corporation of New York Application February 17, 1936, Serial No. 64,188

5 Claims. (Cl. 138—61)

This invention relates to means for guarding hose or like structures from injury or wear which might otherwise be occasioned by the hose coming against other objects. It has particular use in connection with the guarding of flexible gasoline hose, such as is used for constituting a conduit from the usual pump to the tanks of motor cars but is not limited to such application.

The main object of the invention is to provide a device of the character as described which shall be simple and yet efficient in operation.

A further object of the invention is to provide a device of the character as indicated which shall be readily attachable and detachable to and from the hose and when in attached position shall be firmly secured thereto.

A further object of the invention is to provide a strip of longitudinally resilient material which shall be transversely concaved on the side next the hose whereby the edges, thereby thinned, are readily flexible to adapt themselves to and be firmly located upon the hose.

A further object of the invention is to provide a strip which may be helically wound upon a hose and then secured by passing its ends beneath convolutions of the strip.

A further object of the invention is to provide a strip whereof the ends are thin with relation to the intermediate portion whereby a rib of considerable height is afforded and, when the strip is helically disposed on the hose, the ends may be secured by passing them beneath strip convolutions without materially raising the convolution from the hose at the points where the ends are passed under the strip convolutions, and the whole lies flatly and firmly upon the hose.

A further object of the invention is to provide a protective strip of the character indicated with its end portions of less thickness than the intermediate portions with the advantages as just indicated but wherein the side of the strip next the hose is longitudinally straight so that the strip lies flatly and firmly upon the hose.

A further object of the invention is to provide an improved method of applying the guard to the hose which involves the helical winding of a resilient strip under tension upon the hose. The tension thus resulting in the resilient strip causes the strip to tightly and securely hug the hose and prevents it from being accidentally displaced.

A further object of the invention is to provide a protective strip of the character indicated which shall have projections on the side of the strip next the hose, adapted to engage and interlock with the surface of the hose especially where the outer surface of the hose is of woven material such as canvas.

A further object of the invention is to make such projections in the form of cups, this construction in the case of many of the cups upon the canvas surface, and in practically all when the exterior surface of the hose is smooth, will form vacuum cups whereby the strip is more securely held in place.

Other and ancillary objects of the invention will appear hereinafter.

In the accompanying drawing which illustrates the invention:

Fig. 1 is a side elevation of a usual form of gasoline service pump having a flexible hose to which the improved guard is applied.

Fig. 2 is a view on an enlarged scale of a portion of a hose to which the improved guard strip is applied.

Fig. 3 is a top plan or outside view, partly broken away, and on an enlarged scale of the guard strip prior to its application to the hose.

Fig. 4 is a side elevation of the device of Fig. 3.

Fig. 5 is an end view on an enlarged scale of the strip of Fig. 3.

Fig. 6 is a section on the line 6—6 of Fig. 4.

Fig. 7 is a side elevation, similar to Fig. 4, and on the same scale showing an improved end construction for the strip whereby it may be more securely held from withdrawal from beneath the strip convolution under which it is secured.

Fig. 8 is a plan view of a modified form of guard strip partly broken away.

Fig. 9 is a side elevation of the strip portions as shown in Fig. 8.

Fig. 10 is a plan view partly broken away of a still further modified form of guard strip; and Fig. 11 is a side elevation on a reduced scale of the strip parts shown in Fig. 10.

Referring to the drawing, and first to Figs. 1 to 6 inclusive, the usual gasoline service pump 1 is provided with the flexible hose 2 by which the gasoline is conducted to the nozzle 3 which may be inserted within the filling opening of an automobile gasoline tank. The guard strip 4 is applied to the hose at the point most likely to rub upon and be worn by the pedestal of the pump or the edge of the street curb.

The strip 4 may be of resilient material, such as rubber which has no "set" for any particular form, having the intermediate portion 5 and the end portions 6 and 7 which are thinner from the inner face to the outermost boundary than the intermediate portion, this being clearly shown in Fig. 4. Also the end portions 6 and 7 are narrower than the intermediate portion 5 as clearly appears in Fig. 3.

The inner side 8 of the strip which comes against the inner surface of the hose is concave as clearly appears the outer surface 9 of the strip being rounded or convex. The side 8 of the hose is substantially longitudinally straight (see Fig. 4).

The rubber strip is applied to the hose as a helix, with the longitudinally straight but transversely concaved side 8 against the hose, the strip being wound helically as clearly shown in Fig. 2 and, being longitudinally resilient, will be stretched by longitudinal pulling or tension during the winding. The end 7 of the strip has the first convolution wound over it, the helical winding then proceeding to the end where the other end portion 6 of the strip is inserted between the last convolution and the hose. The tension placed in the strip while winding will cause the strip to be held tightly against the hose and upon the ends 6 and 7. The ends 6 and 7 will therefore be securely held against accidental displacement (it will be apparent that if either end were free the strip could unwind and become displaced from the hose) and all of the convolutions are drawn by the tension tightly towards the hose so that the strip is firmly and securely located thereon. The concavity of the side 8 produces the thinned edges at the edges of the strip, which thinned edges are easily flexible so that under the longitudinal tension or stretch of the strip they can give to permit the inner side of the hose to adapt itself to and be securely seated upon the hose.

The ends of the strip being relatively thin, they will not cause any material hump in the strip, nor materially raise the overlying portion of the strip from the hose, so that the whole will be securely and stably held in position. By making the side of the rubber strip which engages the hose substantially longitudinally straight (see Fig. 4) and causing the relative thinness of the ends to be accomplished by tapering down the outside of the strip a firm and stable co-operation of the strip with the hose is secured.

The strip being constructed and applied as described it will be securely and firmly held in the position as shown in Figs. 1 and 2 from which it will be observed that the strip convolutions form a guard rib which projects outwardly from the hose and prevents extraneous objects from coming into contact with and injuring or wearing it, and it will further be apparent that there may be any number of guards applied to a hose at any desired number of points which may be considered vulnerable.

Referring to Fig. 7 the ends of the rubber strip as above referred to may each be provided with an abutment or shoulder 10 which, when the end is passed beneath a strip convolution, will act to prevent accidental withdrawal of the end from its position beneath such convolution and will thus tend to more surely prevent the accidental unfastening of the strip, and its detachment from the hose.

Referring to the modification as shown in Figs. 8 and 9, the strip of rubber or other suitably resilient material has the side 11 adjacent the hose when placed in operative position thereon and the other side 12 is transversely convex.

From the side 11 extend the cup-shaped projections 13 which operate to securely and firmly mount the strip upon the protected hose. The projections 13 are adapted to engage with the surface of the protected hose especially when the outer surface is of the usual canvas. The efficiency of the projections is still further enhanced by making them cup-shaped whereby they readily adapt themselves to interlock with the surface of the hose and also the cups, even where the outer surface of the hose is canvas will form vacuum spaces in conjunction with the hose in many instances and this will be true of substantially all the cups if the surface of the hose is smooth, the cups acting after the fashion of the well known vacuum cups of tire threads.

In the structure of Figs. 10 and 11 the side 14 of the strip next the hose when in protecting position is what may be termed "knurled", it having transverse and longitudinal intersecting grooves forming the pyramid shaped projections 15 which readily engage with the opposing surface of the hose and operate to securely position the strip upon the hose, against displacement. The outer side 16 of the strip of Figs. 10 and 11 is convex in transverse section.

While the invention has been illustrated in what are considered its best applications, it may be embodied in other structures without departing from its spirit and is not therefore limited to the structures shown in the drawing.

What we claim is:

1. A longitudinally resilient guard strip adapted to be helically wound about a hose or the like to form a guard therefor having that side transversely concaved which is adapted to come against the hose when installed thereon and the outer side of said strip, which is opposite said concaved side, being transversely rounded.

2. A guard strip adapted to be helically wound about a hose or the like to form a guard therefor, said strip having a securing shoulder adjacent an end thereof.

3. The combination with a hose, of a longitudinally resilient guard strip wound helically thereabout under tension, the end portions of said strip being beneath convolutions of said strip and said strip having shoulders for preventing removal of said ends from beneath said convolutions, said strip being of substantial thickness intermediate said end portions, forming relatively high ribs disposed along said hose in the form of open convolutions stretched tightly against the hose by virtue of the anchorage at said ends and permitting the free flexure of the hose in all directions.

4. A longitudinally resilient guard strip adapted to be helically wound about a hose or the like to form a guard therefor having its side which is adapted to come against the hose when installed thereon provided with a multiplicity of closely disposed projections.

5. A longitudinally resilient guard strip adapted to be helically wound about a hose or the like to form a guard therefor having its side which is adapted to come against the hose when installed thereon provided with a plurality of projecting vacuum cups.

ARCHIBALD L. WALLACE.
ROBERT BERKOWITZ.